(No Model.)
J. B. DOCKERY.
COMBINATION SOFT METAL PIPE COUPLING.
No. 549,902. Patented Nov. 19, 1895.
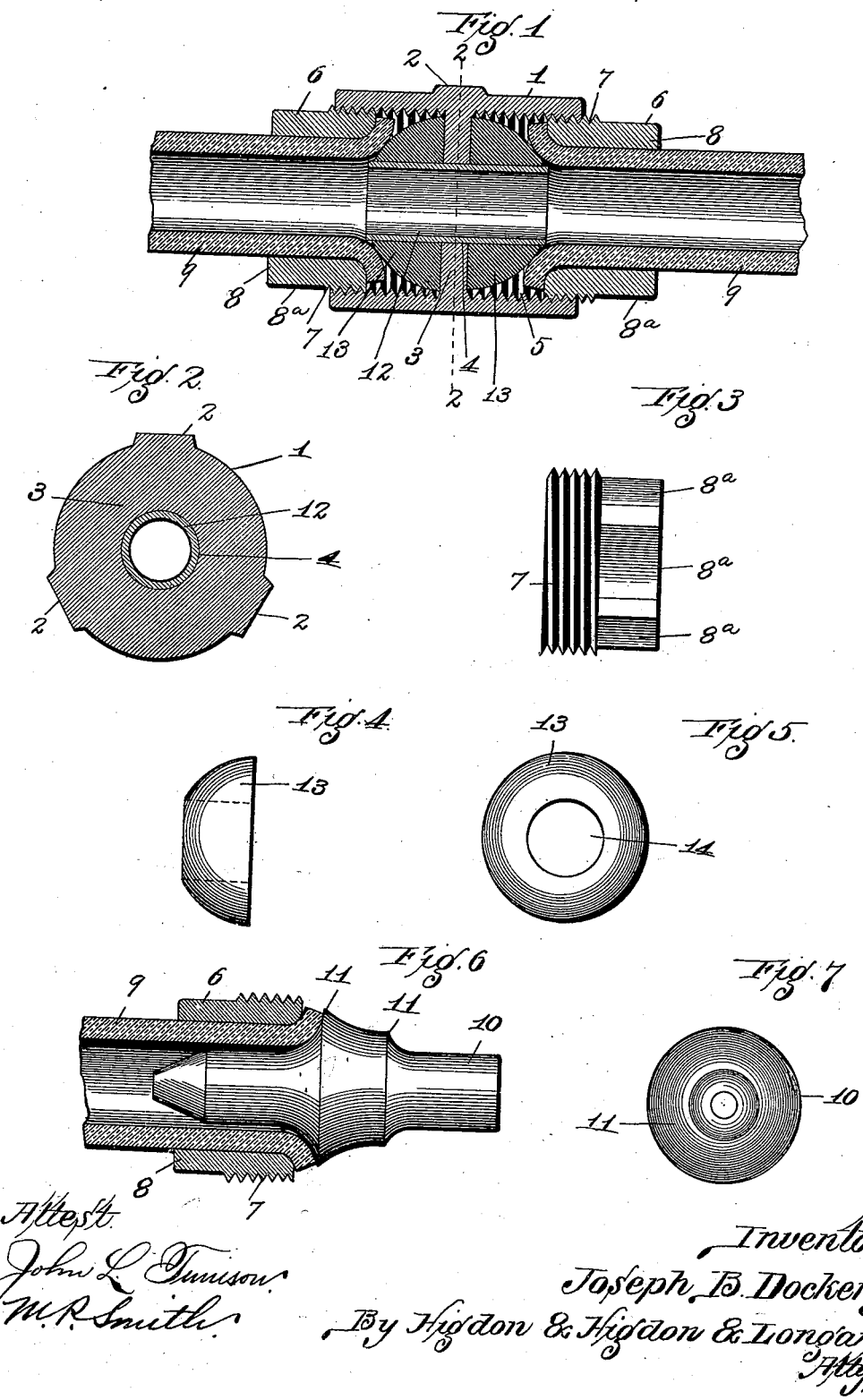
Attest:
John L. Tunison
M. R. Smith
Inventor:
Joseph B. Dockery
By Higdon & Higdon & Longan
Attys

UNITED STATES PATENT OFFICE.

JOSEPH B. DOCKERY, OF ST. LOUIS, MISSOURI, ASSIGNOR OF ONE-HALF TO J. GILMAN CHOUTEAU, OF SAME PLACE.

COMBINATION SOFT-METAL-PIPE COUPLING.

SPECIFICATION forming part of Letters Patent No. 549,902, dated November 19, 1895.

Application filed August 12, 1895. Serial No. 559,038. (No model.)

*To all whom it may concern:*

Be it known that I, JOSEPH B. DOCKERY, of the city of St. Louis, State of Missouri, have invented certain new and useful Improvements in Combination Soft-Metal-Pipe Couplings, of which the following is a full, clear, and exact description, reference being had to the accompanying drawings, forming a part hereof.

My invention relates to a combination soft-metal-pipe coupling; and it consists in the novel construction, combination, and arrangement of parts hereinafter described and claimed.

In the drawings, Figure 1 is a longitudinal sectional view of my improved coupling, the same being applied to the meeting ends of pipe. Fig. 2 is a vertical cross-sectional view taken approximately on the indicated line 2 2 of Fig. 1. Fig. 3 is a side elevation of one of the male parts of my improved coupling. Fig. 4 is a side elevation of one of the washers made use of in my improved coupling. Fig. 5 is a front view thereof. Fig. 6 is a sectional view showing the tool used for forming the flaring edges of the meeting ends of the soft-metal pipe which are connected by my improved coupling. Fig. 7 is a bottom plan view of the tool seen in Fig. 6.

Referring by numerals to the accompanying drawings, 1 indicates the female part of the coupling, the same being constructed of any suitable material tubular in form and provided on its exterior surface with a series of faces 2, on which a wrench or like tool may be engaged. Located upon the interior of the female part 1 and at its longitudinal center is a diaphragm 3, having axially located therein a circular aperture 4. The interior surfaces of the female part 1 from the diaphragm 3 to the ends of said part are screw-threaded, as indicated by 5.

6 6 indicate the male parts of my improved coupling, the same comprising the screw-threaded portions 7, arranged to enter the screw-threaded ends of the female part 1, and the annular portions 8, the same being provided with faces 8ª, on which may be engaged a wrench or like tool.

9 9 indicate the ends of the soft-metal pipe that are to be coupled together, and previous to making the first coupling said ends are passed through the male parts 6 of the coupling in such a manner as that the ends protrude a slight distance through said male parts. A metallic spindle 10, having curved annular flanges 11 thereon, is now located in the protruding end of said pipe, and by the repeated blows of a hammer upon the protruding end of said spindle 10 the end of the soft-metal pipe 9 is flared outwardly to conform with the curvature of the inner end of the male part 6 of the coupling.

12 indicates a thin metallic tube somewhat shorter than is the female part 1 of the coupling and of such a diameter as that it will readily fit within the aperture 4 in the diaphragm 3. Arranged upon the protruding ends of this tube 12 in such a manner as that their flat sides engage against the faces of the diaphragm 3 are washers 13 of rubber, leather, or analogous material, the same being hemispherical in form and each constructed with a centrally-arranged aperture 14.

To effect a coupling by my improved means, the male parts 6 of said coupling are first slipped over the meeting ends of the soft-metal pipe 9 and the ends of said pipe flared outwardly by means of the tool 10. Said male parts 6, located upon the ends of the pipe 9, are now, by means of a wrench or like tool, so manipulated as that they are passed into the screw-threaded ends of the female part 1 of the coupling, the tube 12 having previously been forced through the aperture 4 in the diaphragm 3 and the washers 13 having been located on the protruding ends of said tube 12. The male parts of the coupling are passed into the female part 1 until the screw-threaded portions of the said male parts 6 are very firmly located in the end of the female part 1 and the flared ends of the pipe 9 very firmly and tightly engage upon the flexible washers 13. In this manner a perfectly air and water tight joint is formed between the meeting ends of the pipe 9. By locating an integral diaphragm within the female part of the coupling and longitudinally arranging the tube 12 within said diaphragm the internal diameter of the coupled pipe is preserved entirely through the coupling, as said tube 12 prevents the flexible washers or packing located upon its ends from being forced together at the center of the coupling, as the male parts 6 are, by a wrench or like tool firmly seated in the ends of the female part 1 and the flared ends of the pipe 9, carried by said male parts, are engaged upon the curved faces of the washers 13.

By constructing the washers in hemispherical form gradually-curved surfaces for the flaring ends of the pipe to engage upon are formed. Thus a perfectly-tight joint between said washers and the flared ends of the pipe is insured.

By forming the flanges on the spindle 10 on a gradual curve to conform with the curvature of the inner edges of the male parts 6 of the coupling the ends of the pipe 9 are flared outwardly on a true curve and the thickness of the metal of the pipe is preserved throughout the entire flared portion.

A pipe-coupling of my improved construction possesses superior advantages in point of simplicity, durability, and general efficiency, saves much time, labor, and expense in making a coupling between the meeting ends of soft-metal pipe, is inexpensive, and may be readily applied for use or uncoupled.

I claim—

In a pipe coupling of the class described, a female part constructed with a centrally arranged diaphragm in which is formed an aperture, a tube arranged longitudinally within said aperture, hemispherically formed packings arranged upon the protruding end of the tube, and male parts located upon the flared ends of the pipe, said male parts being arranged within the ends of the female part so that the flared ends of the pipe engage against the packings.

In testimony whereof I affix my signature in presence of two witnesses.

JOSEPH B. DOCKERY.

Witnesses:
E. E. LONGAN,
MAUD GRIFFIN.